United States Patent [19]

Stafford et al.

[11] Patent Number: 4,570,702

[45] Date of Patent: Feb. 18, 1986

[54] SHELL AND TUBE VERTICAL HEAT EXCHANGER WITH SLEEVES AROUND THE TUBES

[75] Inventors: Donald C. Stafford, Hinsdale; Tushar K. Shah, Cresthill; Vincent F. Allo, Warrenville, all of Ill.

[73] Assignee: Chicago Bridge & Iron Company, Oak Brook, Ill.

[21] Appl. No.: 479,698

[22] Filed: Mar. 28, 1983

[51] Int. Cl.[4] ............................................. F28D 7/00
[52] U.S. Cl. .................... 165/159; 165/139; 165/160; 122/367 C; 62/238.6
[58] Field of Search ................ 165/159, 160, 139; 62/238.6

[56] References Cited

U.S. PATENT DOCUMENTS

| 948,835 | 2/1910 | Walter | 165/160 |
|---|---|---|---|
| 1,147,734 | 7/1915 | Junkers | 122/367 C |
| 1,517,673 | 12/1924 | Eberle | 165/139 |
| 2,070,189 | 2/1937 | Webster | 165/159 |
| 2,341,319 | 2/1944 | Graham et al. | 165/160 |
| 3,117,559 | 1/1964 | Fouche | 165/160 |
| 3,356,135 | 12/1967 | Sayre | 165/159 |
| 4,248,179 | 2/1981 | Bonner | 122/367 C |
| 4,406,137 | 9/1983 | Demuth et al. | 62/238.6 |

FOREIGN PATENT DOCUMENTS 78641 3/1917 Austria .................... 165/139

Primary Examiner—Henry C. Yuen
Attorney, Agent, or Firm—Marshall, O'Toole, Gerstein, Murray & Bicknell

[57] ABSTRACT

A heat exchanger comprising a shell connected to vertically spaced apart horizontally arranged circular upper and lower tube sheets; a plurality of vertically positioned parallel tubes, with each tube extending through and connected to a hole in each tube sheet; a bottom sleeve-supporting plate positioned above, and spaced apart from, the lower tube sheet; a top sleeve-supporting plate positioned below, and spaced apart from, the upper tube sheet; a plurality of sleeves joined to holes in the top and bottom sleeve-supporting plates; each of said tubes being axially positioned in a sleeve so as to provide an annular space between the tube outer surface and the sleeve inner surface so that liquid can flow into the sleeve bottom end and out the sleeve upper end; an inlet to feed a heat exchange liquid into a space between the bottom sleeve-supporting plate and the lower tube sheet; an outlet to withdraw heat exchange fluid from the shell side of the heat exchanger above the bottom sleeve-supporting plate; and a liquid distribution box positioned above the upper tube sheet and a feed inlet to deliver a feed liquid to the liquid distribution box.

1 Claim, 2 Drawing Figures

SHELL AND TUBE VERTICAL HEAT EXCHANGER WITH SLEEVES AROUND THE TUBES

This invention relates to shell and tube vertical heat exchangers. More particularly, this invention is concerned with an improved heat exchanger which has vertical tubes surrounded by external sleeves to form an annular space therebetween through which a heat exchange fluid can flow so as to improve heat exchange between the falling film in the tubes and the heat exchange fluid in the annular space.

BACKGROUND OF THE INVENTION

Shell and tube heat exchangers have an array of tubes extending between and through two spaced apart tube sheets surrounded by a shell. The shell is provided with an inlet and an outlet so that a suitable heat exchange liquid or gas can be circulated through the shell to cool or heat a liquid flowing through each tube.

Each end of the array of tubes can be left open or exposed, for use in some processing operations. For other operations, one or both ends can be enclosed by a liquid retaining header, which may or may not have a removable cover or access port.

Although shell and tube heat exchangers are generally used to heat a liquid feed stream, they can be used for cooling such a stream. Shell and tube heat exchangers of the described types can be used as freeze exchangers for producing fresh water from brackish water and seawater, for concentrating fruit and vegetable juices, coffee and beer, and industrial crystallization processes. As the liquid flows through each tube, it can be cooled enough to crystallize a solid from the liquid. Thus, by cooling seawater, ice is obtained which when separated, washed and melted provides potable water. When a fruit or vegetable juice is similarly chilled, ice forms and is removed to provide a concentrated juice.

Freeze exchangers of the described type can use any cooling fluid on the shell side to cool a liquid flowing downwardly through the tubes. The cooling fluid can be fed through one end and removed through the other end of the freeze exchanger in a substantially unidirectional flow. Some suitable cooling fluids include refrigerant gases such as ammonia and Freon brand refrigerants, and aqueous ethylene glycol.

When a refrigerant is used, it is generally liquefied first and then fed as a liquid to the shell side of the freeze exchanger through an inlet port in the lower part of the shell. A volume of refrigerant liquid is maintained on the shell side with a refrigerant vapor volume above the liquid level. The refrigerant liquid level is usually maintained about at the lower part of an outlet port in the shell below the upper tube sheet. Accordingly, essentially refrigerant vapor and little liquid is withdrawn from the outlet port.

Even though the cooling liquid essentially fills the shell side around the tubes, heat exchange across the tubes is unexpectedly lower than one might expect. This is in part, perhaps, due to a somewhat stagnant liquid pool around the exterior surfaces of the tubes and a tendency for vapor to cling to that surface. A need accordingly exists for improving heat exchange between the liquid in the tubes and the heat exchange fluid outside the tubes.

SUMMARY OF THE INVENTION

According to the invention there is provided a heat exchanger comprising a shell connected to vertically spaced apart horizontally arranged circular upper and lower tube sheets; a plurality of vertically positioned parallel tubes, with each tube extending through and connected to a hole in each tube sheet; a bottom sleeve-supporting plate positioned above, and spaced apart from, the lower tube sheet; a top sleeve-supporting plate positioned below, and spaced apart from, the upper tube sheet; a plurality of sleeves joined to holes in the top and bottom sleeve-supporting plates; each of said tubes being axially positioned in a outer surface and the sleeve inner surface so that a heat exchange liquid can flow into the sleeve bottom end and out the sleeve upper end; means to feed a heat exchange liquid into a space between the bottom sleeve-supporting plate and the lower tube sheet; means to withdraw heat exchange fluid from the shell side of the heat exchanger above the bottom plate; and a liquid distribution box positioned above the upper tube sheet and means to deliver a feed liquid to the liquid distribution box.

The turbulent flow of heat exchange liquid and vapor in the annular space between each tube and surrounding sleeve enhances heat exchange and results in a more efficient heat exchange with the falling film in the tube. Heat transfer between the heat exchange fluid in the annular space and the fluid outside the sleeves is poor since there is very little turbulence there and only a small temperature difference. This is intended and desirable according to the invention.

The bottom sleeve-supporting plate can contain one or more holes to equalize the pressure on both sides of the plate. These holes can be small in diameter and few in number.

The top sleeve-supporting plate can also contain holes so as to permit heat exchange liquid to flow from the shell side of the heat exchanger, in the space between the top sleeve-supporting plate and the top tube sheet, into the space between the top and bottom sleeve-supporting plates.

Each sleeve desirably contains means to create turbulent flow of heat exchange fluid in the annular space between the sleeve and tube surrounded by the sleeve. Thus, each sleeve can have a corrugated wall to induce turbulent flow.

It is further desirable for the heat exchanger to have means to remove heat exchange fluid from the shell side beneath the top sleeve-supporting plate, and means to remove heat exchange fluid from above said plate.

The invention is especially useful in a falling film heat exchanger.

DETAILED DESCRIPTION OF THE DRAWINGS

To the extent it is reasonable and practical, the same numbers will be used to identify the same or similar elements or parts in the various views of the drawings.

Figure 1:
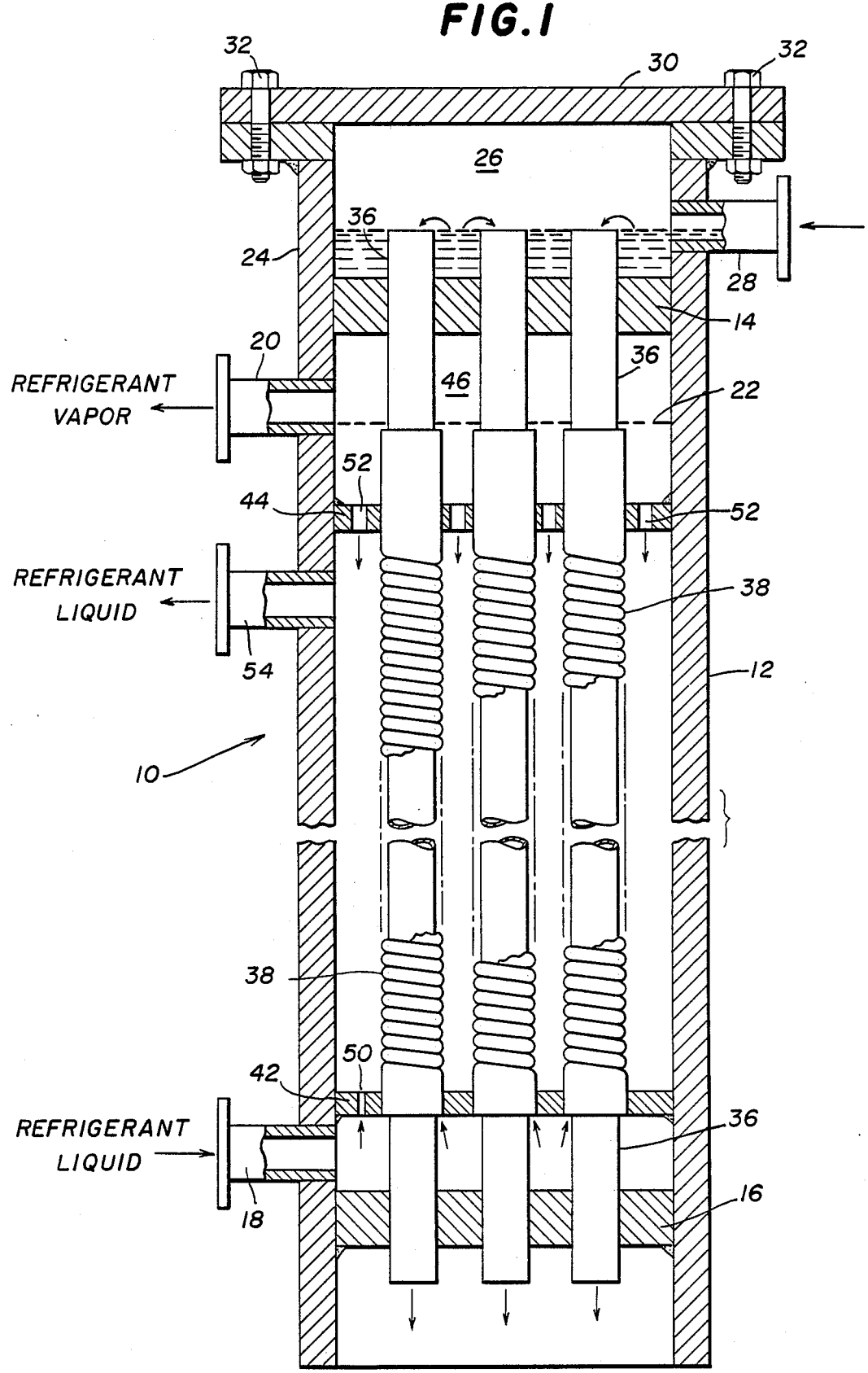
FIG. 1 is a vertical sectional view, partially broken away, of a falling film heat exchanger according to the invention.

With reference to FIG. 1, the falling film heat exchanger 10 has a vertical cylindrical circular metal shell 12 which is joined to upper tube sheet 14 and lower tube sheet 16. It is especially useful as a freeze exchanger. Thus, a liquefied refrigerant gas can be fed to the shell side of the freeze exchanger 10 through inlet port 18. Refrigerant vapor can be removed through upper outlet port 20 which is located partially or wholly above the refrigerant liquid level 22.

Extending upwardly from the edge of upper tube sheet 14 is a wall extension 24 of shell 12 which defines a distribution box surrounding space 26. Port 28 provides a means for delivering an aqueous feed liquid to space 26. Cover 30, removably secured in place by bolts 32, is placed on top of wall 24.

Each one of a plurality of vertically positioned parallel circular cylindrical tubes 36 extends through and is joined to vertically aligned holes in the upper tube sheet 14 and the lower tube sheet 16. Feed liquid fed to space 26 flows downwardly through the tubes 36 and then out the open lower end of the freeze exchanger 10. If desirable, the lower end of the freeze exchanger 10 can be suitably enclosed.

Figure 2:
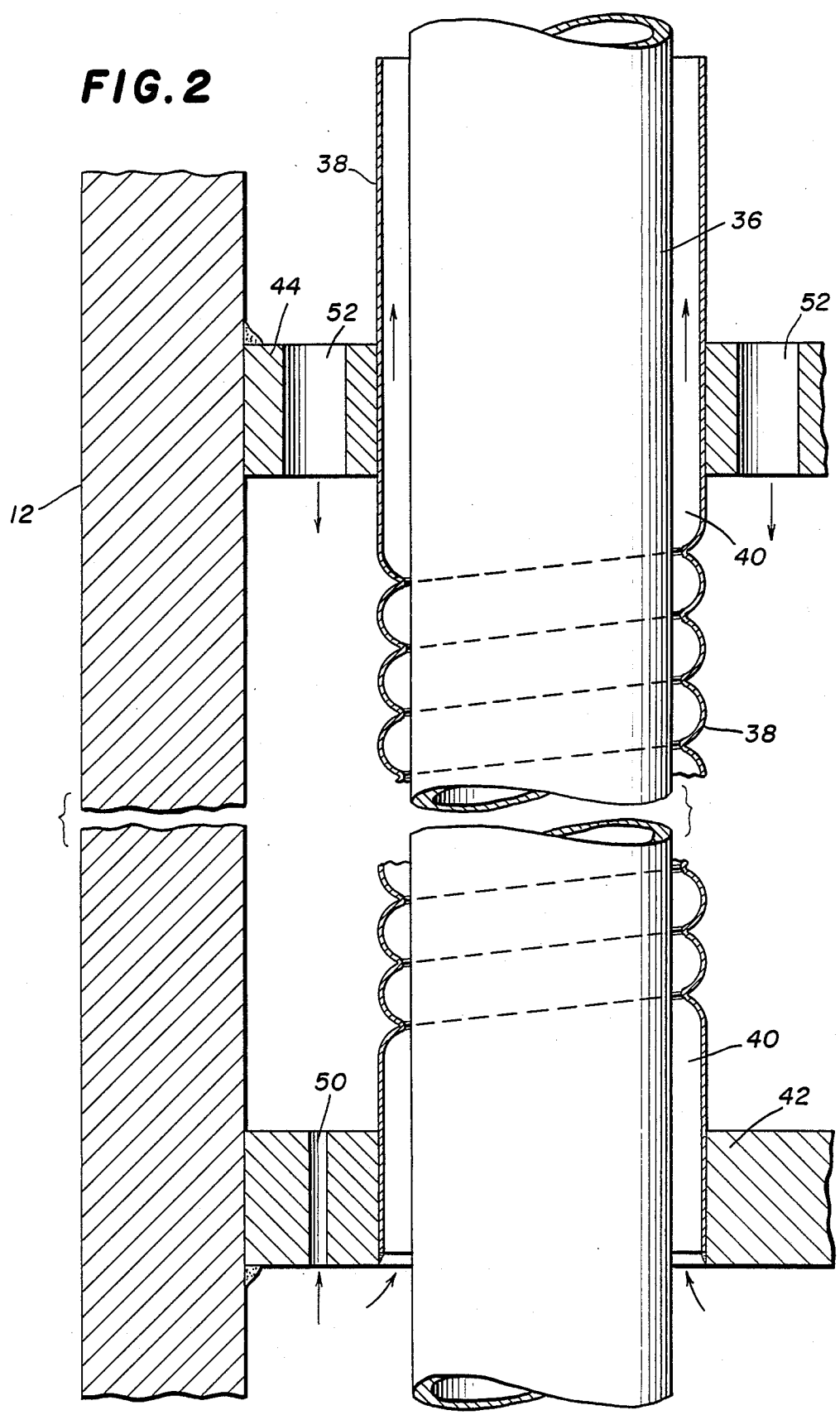
FIG. 2 is an enlarged view, partially in section and broken away, of a heat exchanger tube with a surrounding sleeve connected to sleeve-supporting plates.

As shown in FIGS. 1 and 2, a solid walled circular corrugated sleeve 38 surrounds each tube 36 in spaced apart axial arrangement so as to provide a fluid space 40 between each tube exterior surface and each sleeve interior surface. The lower end of sleeve 38 is joined to the wall of a hole in bottom sleeve-supporting plate 42, and the upper end of each sleeve is joined to the wall of a hole in a top sleeve-supporting plate 44, by suitable means, such as welding when the elements are each metal.

Liquefied refrigerant gas supplied through inlet port 18 flows upwardly through the annular space between each tube 36 and corrugated sleeve 38. Because of the corrugations in the sleeves 38, turbulent flow is produced, leading to better heat exchange than would be achieved with smooth surface sleeves. However, smooth surface sleeves are suitably used in the freeze exchanger 10 in place of corrugated sleeves. Also, suitable turbulent flow can be produced by using smooth sleeves containing internal spaced apart fins, vanes or deflectors.

A mixture of liquefied refrigerant and refrigerant vapor flows out the upper open ends of the sleeves and accumulates in space 46. Refrigerant vapor and some refrigerant liquid is withdrawn through outlet port 20. The vapor is subsequently reliquefied and returned to the freeze exchanger 10 through inlet port 18. The refrigerant liquid flows through one or more holes 52 in top sleeve-supporting plate 44 into the space between that plate and bottom sleeve-supporting plate 42. In this way, the shell side of the heat exchanger is filled with refrigerant. Of course, vapor can flow upwardly through holes 52 into space 46.

One or more holes 50 are provided in bottom sleeve-supporting plate 42 so that the refrigerant pressure can be equalized on each side thereof.

To further enhance the heat exchange capacity of tubes 36, they can be externally roughened or abraded since that has a beneficial effect by increasing turbulent flow of the refrigerant liquid in the annulus between the tubes 36 and sleeves 38.

The described freeze exchanger can be used to produce fresh water from sea water and brackish water and to concentrate fruit and vegetable juices, coffee and beer. Such an aqueous feed, supplied through inlet port 28, flows over the upper edge of tubes 36 and then down the tubes as a thin film. Heat exchange to a refrigerant flowing upwardly in the annulus between each tube and its surrounding sleeve causes ice particles to form in the aqueous liquid. Separation of the ice particles from sea water or brackish water and subsequent melting of the ice yields potable water. If the feed is a juice, coffee or beer, removal of the ice gives a concentrated product.

The described apparatus can also be used effectively when some other coolant than a refrigerant is used. Specifically cold ethylene glycol can be used for some cooling purposes.

The heat exchange liquid need not be a cold liquid since the apparatus can also be used as a heat exchanger by circulating a hot liquid through the shell side of the apparatus. Hot water or a hot oil, for example, can be circulated as described to heat a liquid flowing through the tubes 36.

The foregoing detailed description has been given for clearness of understanding only, and no unnecessary limitations should be understood therefrom, as modifications will be obvious to those skilled in the art.

What is claimed is:

1. A heat exchanger comprising:
- a shell connected to vertically spaced apart horizontally arranged circular upper and lower tube sheets;
- a plurality of vertically positioned parallel tubes, with each tube extending through and connected to a hole in each tube sheet;
- a bottom sleeve-supporting plate positioned above, and spaced apart from, the lower tube sheet;
- the bottom sleeve-supporting plate containing a hole which equalizes heat exchange liquid pressure on both sides of the plate;
- a top sleeve-supporting plate positioned below, and spaced apart from, the upper tube sheet;
- the top sleeve-supporting plate containing holes which permit heat exchange liquid to flow from above that plate into the space between the bottom and top sleeve-supporting plates;
- a plurality of sleeves joined to holes in the top and bottom sleeve-supporting plates;
- each sleeve having a corrugated wall to create turbulent flow of heat exchange fluid in the annular space between the sleeve and tube;
- each of said tubes being axially positioned in a sleeve so as to provide an annular space between the tube outer surface and the sleeve inner surface so that a heat exchange liquid can flow into the sleeve bottom end and out the sleeve upper end;
- means to feed a heat exchange liquid into a space between the bottom sleeve-supporting plate and the lower tube sheet;
- means to withdraw heat exchange fluid from the shell side of the heat exchanger above the bottom sleeve-supporting plate and including means to withdraw heat exchange fluid from between the top sleeve-supporting plate and the upper tube sheet and means to withdraw heat exchange fluid from below the top sleeve-supporting plate; and
- a liquid distribution box positioned above the upper tube sheet and means to deliver a feed liquid to the liquid distribution box.

* * * * *

UNITED STATES PATENT AND TRADEMARK OFFICE
CERTIFICATE OF CORRECTION

PATENT NO. : 4,570,702

DATED : February 18, 1986

INVENTOR(S) : DONALD C. STAFFORD ET AL

It is certified that error appears in the above-identified patent and that said Letters Patent is hereby corrected as shown below:

Column 2, line 14, before "outer" insert -- sleeve so as to provide an annular space between the tube --.

Signed and Sealed this

Twenty-seventh Day of May 1986

[SEAL]

Attest:

DONALD J. QUIGG

Attesting Officer

Commissioner of Patents and Trademarks